United States Patent [19]

Longo et al.

[11] Patent Number: 4,903,218
[45] Date of Patent: Feb. 20, 1990

[54] CONSOLE EMULATION FOR A GRAPHICS WORKSTATION

[75] Inventors: Mark Longo, Nashua, N.H.; Steven D. DiPirro, Holliston, Mass.

[73] Assignee: Digital Equipment Corporation, Maynard, Mass.

[21] Appl. No.: 84,930

[22] Filed: Aug. 13, 1987

[51] Int. Cl.$^4$ .............................................. G06F 3/037
[52] U.S. Cl. ...................................... 364/521; 364/900
[58] Field of Search ................ 364/521, 200 MS File; 340/721

[56] References Cited

U.S. PATENT DOCUMENTS 4,550,386 10/1985 Hirosawa et al. ............... 340/721 X
4,591,975 5/1986 Wade et al. ......................... 364/200
4,598,384 7/1986 Shaw et al. ...................... 340/721 X
4,709,328 11/1987 Anthony, Jr. et al. ............. 364/200

Primary Examiner—David L. Clark
Assistant Examiner—Mark K. Zimmerman
Attorney, Agent, or Firm—Kenyon & Kenyon

[57] ABSTRACT

A method and an apparatus for emulating a console at a graphics workstation terminal uses a second central processing unit to perform the console emulation. A windowing system operating on a first central processing unit interfaces with the operation of the console from the second central processing unit to provide nondestructive console emulation at the workstation terminal. The windowing system maintains a separate console window that the second central processing unit can access transparently to the other windows. The first or host cpu can still perform graphics functions while the second cpu operates the console.

5 Claims, 8 Drawing Sheets

X SOFTWARE ORGANIZATION

CONSOLE EMULATION FOR A GRAPHICS WORKSTATION

FIELD OF THE INVENTION

This invention relates to computer graphics workstations in general and, more particularly to console support for a high performance, stand-alone graphics workstation including a digital computer host and a graphics processing subsystem.

BACKGROUND OF THE INVENTION

Computer system users require notification of system problems and a means to examine and diagnose the problems. Generally, a separate console terminal is located next to the system and is connected to the host console terminal port. On a time-sharing, multi-user computer, it is usually the responsibility of a few select users: field servicemen, system managers and operators to interact with the console terminal. However, a user of a single-user workstation must also be able to perform this function in some way.

Presently, graphics workstations allow interaction with the console at the workstation terminal to allow user access. However, when windowing systems are used by the terminal for the display of graphic structures, any console interaction at the terminal destroys all of the window graphics that were present. Accordingly, there is a need to provide console emulation at the workstation terminal which can interact with the graphics windowing system.

SUMMARY OF THE INVENTION

The present invention fills this need through the use of an intermediate control processor which performs the console emulation.

The present invention provides for an emulation of the host console terminal at the graphics workstation. The effect of this is that the user can interact using the workstation itself, including the monitor and keyboard, with the host console terminal. Further, the console emulation is performed using the windowing system of the graphics workstation without destroying any of the graphics of the other windows. Thus the console support is provided for in a window of the workstation terminal.

The console emulation of the present invention is particularly suited for use in a graphics system of the type disclosed in copending U.S. applications Ser. Nos. 085,081 and 085,097, entitled HIGH PERFORMANCE GRAPHICS WORKSTATIONS and PERIPHERAL REPEATER BOX, filed on even date herewith, the disclosure of which is hereby incorporated by reference.

The system of the present invention includes a central processing unit that acts as the workstation's host CPU. Connected to the host processor by means of an intermediate control processing unit and a bus arrangement is a graphics system. The control processing unit handles the interface between the host and graphic systems, interactive device inputs, and the system diagnostics. The graphic system displays and manipulates 2D and 3D color images in real-time.

One of the components of the graphic system's hardware is a structure memory. The host processor is executing one or more application programs, including a console client, residing in the host to build graphic data structures which are stored in the structure memory of the graphics system. The graphics data structures are each implemented as a hierarchical graphics data node structure. For a thorough discussion of interactive computer graphics as generally employed by the system of the invention, reference should be made to *Fundamentals of Interactive Computer Graphics* by J. F. Foley and A. Van Dam (Addision - Wesley 1982).

Each node is defined as a fundamental memory unit to contain graphics data or commands relating to the primitives, transformations, attributes and so on of the graphics structure being built pursuant to a specific application program or console client residing in the host through the utilization of preselected structured graphics routines stored in a memory library, also in the host.

In accordance with known concepts of interactive computer graphics, the invention makes use of a windowing system to provide a conversion from the world coordinate system of the user to appropriate geometric coordinates suitable for the physical display device of the workstation, i.e. the cathode ray tube. A window is a rectangular array of pixels which may be partially or wholly visible on the display device depending upon the size of the window relative to the physical dimensions of the display screen. Windows are also in a hierarchy with a "parent" window and subwindows or "children". Windows may be resized and subwindows used for clipping by the parent when a sub window is sized greater than the parent for detailed display of portions of a display device defined by a graphics structure. As will be described in more detail below a highly advantageous windowing system for use in connection with the display of the graphic structures generated by the application programs and console client is the X Window System developed under the auspices of the Massachusetts Institute of Technology as a royalty free industry standard.

A two dimensional, bit map graphics system is provided to process two dimensional application programs and the console client. The bit map graphics system has resources suitable for two dimensional graphics including a bit map memory and a rendering processor to process the output data stored in the bit map memory. The structure memory is used by the graphics system to serve as the two dimensional bit map memory. The rendering processor is also used by the graphics system to process bit map graphics.

The control processor is responsible for emulating the host console terminal. The host console port is connected to one of the control processor OCTART serial ports, so the emulation is completely transparent to the host. The control processor gathers data from the host console and may display it in a console window created upon initialization of the system. The control processor can also be directed to translate incoming keyboard data and redirect it to the host console port instead of its normal route. The effect as seen by the user is that the workstation itself (monitor and keyboard) can now be used as the host console terminal When the graphics system is powered on, control processor ROM-based code will automatically be in console mode. Once the system has transitioned into an operational state and the control processor RAM has been loaded with the operational firmware, the system is no longer automatically in console mode. At this point, the console is not in regular use. Therefore the control processor must be directed in how to handle console data and when to enter console input mode.

Under normal conditions, no data is being received by the control processor from the host console and keyboard input undergoes normal event processing. When console data is received, the default behavior in the loopback mode described below, transmits a message to the host indicating that console data is available. This permits the host to manage console data if it so desires. In another embodiment the control processor can be directed to not notify the host and to perform console emulation directly (display console data in a console window) without destroying the previous screen contents. There is also a fallback behavior from the loopback made known as stand-alone mode in the event that the host fails to respond when being notified of the availability of console data.

Input from the keyboard can be redirected to the host console by placing the control processor into console input mode. When in this mode, data from the keyboard will be translated and routed to the host console instead of undergoing normal event processing. The console terminal window used for console emulation is created in such a way as to not destroy previous screen contents. This requires cooperation with the windowing system at a low level yet permits screen restoration when console emulation is no longer required. The console window itself is recognizable as a window but does not necessarily have an identical appearance to other windows on the system (header/border differences). It is also recognizable as the console window.

Accordingly, the present invention achieves console emulation at the workstation terminal which can interact with the graphics windowing system even when the host processor is halted without destroying the previous screen contents. Further, through the use of a control processor the emulation is completely transparent to the host. To the user, the console terminal is recognizable as any other window which can be manipulated, resized or iconified.

DETAILED DESCRIPTION OF THE INVENTION

Figure 1:
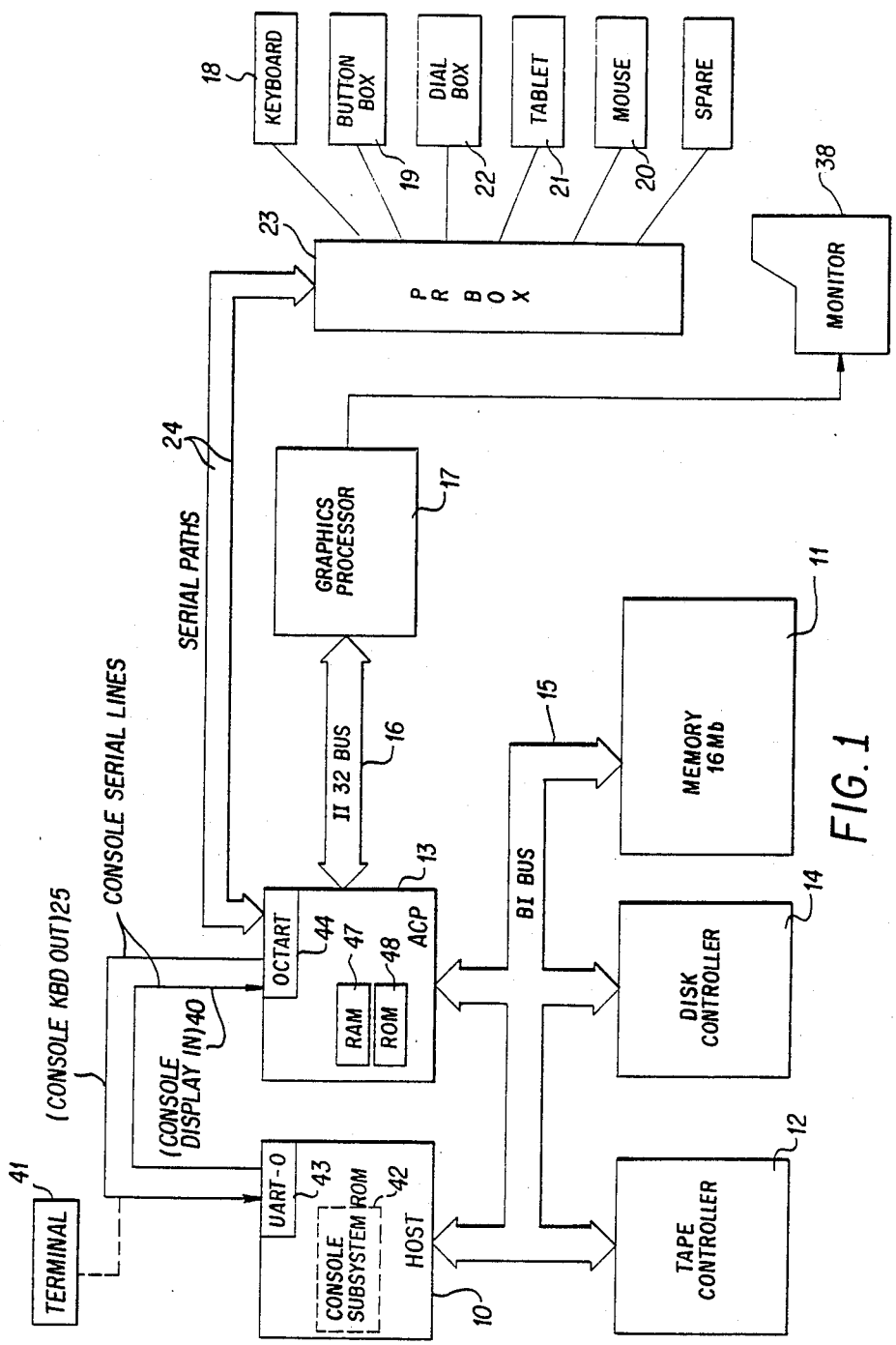
FIG. 1 is an overall block diagram of the system hardware of the graphics workstation.

Referring now to the drawings and initially to FIG. 1, there is illustrated, in block diagram form, the hardware of a graphics workstation system according to the present invention. A host subsystem includes a host central processing unit 10, a host memory 11, a tape/network controller 12, a control processor 13 and a disk controller 14. The host subsystem components 10, 11, 12, 13 are interfaced with one another by means of a bus 15.

A preferred host subsystem for advantageous implementation of the teachings of the invention comprises a Digital KA825 host processor utilized as the host central processing unit 10, a 4-Mbyte MS820-BA memory module as the host memory 11, a DEBNx Ethernet local area network and TK50 95 Mbyte streaming tape drive as the tape controller 12, an RD54 150-Mbyte nonremovable-disk drive and an RX50 818-kbyte diskette drive as the disk controller 14, a Digital KA800 control processor to function as the control processor 13 and a VAX or VAX BI synchronous, time-multiplexed, 32-bit bus as the bus 15. The host processor is a single board VAX processor which executes the complete VAX instruction set and runs either the VMS or ULTRIX operating system and applications. The host processor, control processor, VAX BI bus and other host subsystem components are marketed by the Digital Equipment Corporation, Maynard, Mass.

The control processor 13 is provided with a local or II 32 bus 16 to interface the control processor 13 with a graphics subsystem 17. The control processor 13 therefore acts as an interface between the graphics subsystem 17 and the BI bus 15. The control processor 13 also performs input and output pre-processing for interactive peripheral devices such as a keyboard 18, a button box 19, a mouse 20, a tablet 21 and a dial box 22 which are connected to the control processor 13 by means of a peripheral repeater box 23 through serial data lines 24, as illustrated in FIG. 1. The serial paths connect to what are known as octal asynchronous receiver/transmitter (OCTART) ports of the control processor 13. The peripheral repeater box 23 is utilized to power the peripheral devices 18, 19, 20, 21, 22 at the monitor site and to collect peripheral signals from the peripheral devices 18, 19, 20, 21, 22. The peripheral repeater box organizes the collected peripheral signals by packetizing the signals and sending the packets to the host central processing unit 10 via the control processor 13. The peripheral repeater box 23 also receives packets from the host processing unit 10 via the control processor 13, unpacks the data and channels the unpacked data to the appropriate peripheral device 18, 19, 20, 21, 22. For a more detailed description of the input and output preprocessing functions of the control processor 13 and the peripheral repeator box 23, reference should be made to co-pending application Ser. No. 0985,097 entitled Peripheral Repeater Box, filed on even date herewith.

Console serial paths 25 and 40 are connected from the control processor 13 OCTART ports 44 to what are known as the host serial console Universal Asynchronous Receiver/Transmitter (UART) ports 43. The host console port is a special interface for the console terminal. The control processor 13 emulates the other side of the interface to provide the user with a console terminal emulator to allow interaction with the console program in the host.

A separate console terminal 41 can be connected directly to te host console UART port 43 which would replace the workstation console interface.

The graphics subsystem 17 comprises a graphics card set marketed by the Evans & Sutherland Computer Corporation. The primary function of the graphics subsystem 17 is to store graphics data structures built by the application programs and the console client residing in the central processing unit 10 and to process, manipulate and display the graphics data structures, as will appear.

Figure 1A:
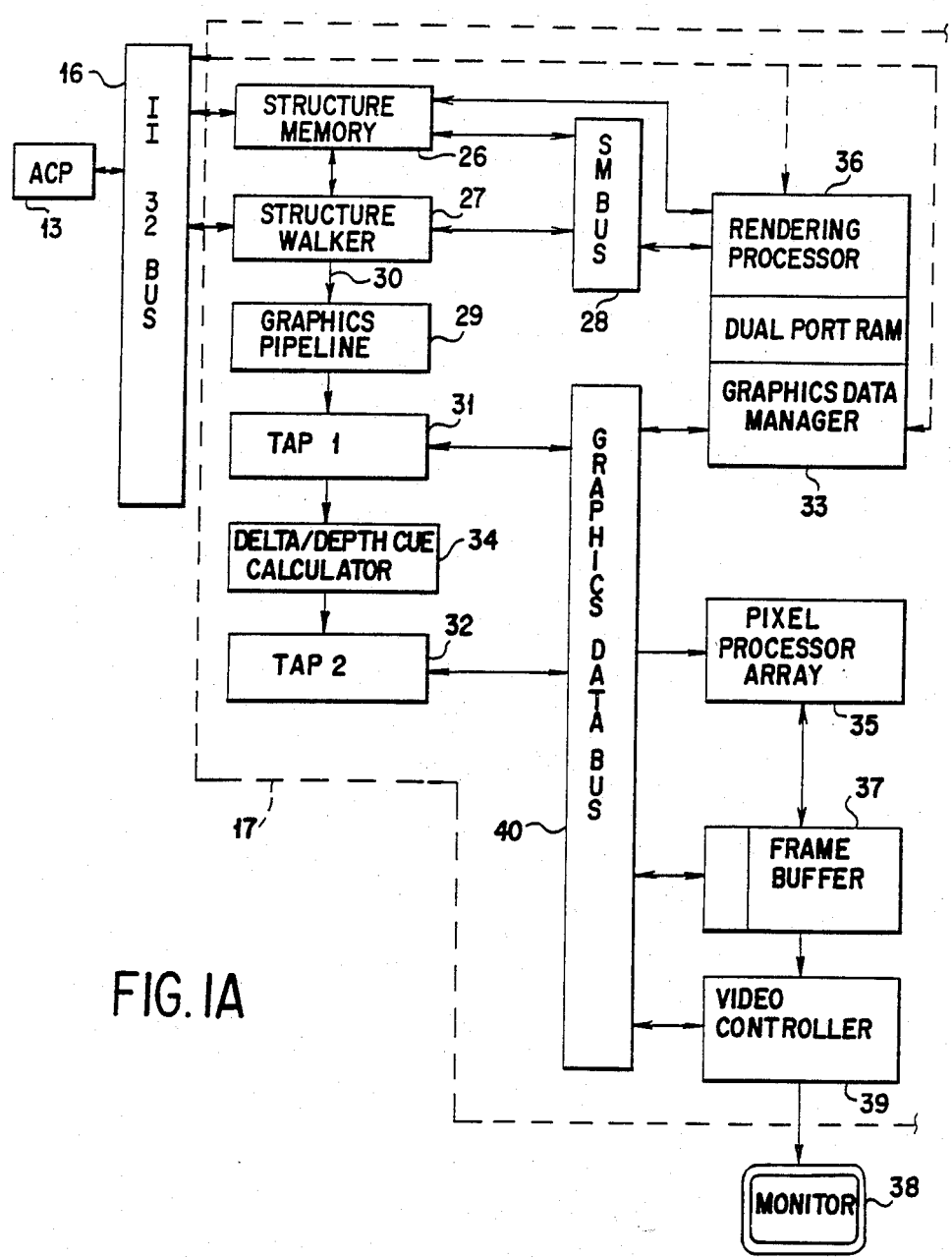
FIG. 1A is block diagram of the graphics processor of FIG. 1.

Referring to FIG. 1A, the graphics card set includes a structure memory 26 interfaced with the control processor 13 by the local II 32 bus 16. As will be described in more detail below, the structure memory comprises a 4-Mbyte memory to store the graphics data structures built by the application programs and console client in the host central processing unit 10.

An asynchronously operational structure walker 27 is interfaced with the control processor 13 by the II32 bus 16 and with the structure memory 26 by a structure memory bus 28. The structure walker 27 is a special-purpose, 32 bit, bit-slice microprocessor that traverses the graphics data structures stored in the structure memory 26 on a continuous, sequential, unprioritized basis and sends he graphics data to the graphics pipeline processor 29 through line 30. The graphics date eventually is displayed on the monitor 38 after being further processed by various components 31, 32, 33, 34, 37, 39 and 40.

The graphics data manager 33 is used to load all valid draw commands for loading into the pixel processor 35 and further operates to buffer pipeline commands to a rendering processor 36 and to buffer data from the rendering processor 36 to the pixel processor 35. For a more detailed description of the rendering processor as well as the overall system reference should be made to co-pending application Ser. No. 085,081, entitled High Performance Graphics Workstation, filed on an even date herewith.

The pixel processor 35 comprises sixteen identical processors which draw antialiased and depth-cued lines using the endpoint and slope data produced by the delta/depth cue calculator 34 as well as the polygon rendering data provided by the rendering processor 36. The data from the pixel processor 35 is sent to a frame buffer 37 which comprises a 1024×1024 pixel memory to contain the pixel image generated for the system monitor 38. The frame buffer 37 provides a 1024×864, 60 hz noninterlaced, rastar-scan display format.

A video controller 39 receives the output from the frame buffer 37 and converts the digital data to an analog signal to drive the monitor 38. The monitor 38 may be a Digital VR290-DA/D3/D4 nineteen inch color monitor having a 1024×864 pixel image area. The video controller 30 also contains a window look up table to determine the video format for the display and a color look up table of color values to define the red, green and blue components of the pixels. A graphics data bus 40 is provided to interface the video controller 30 and the various other components of the graphics subsystem 17, as illustrated in FIG. 1A.

Figure 2:
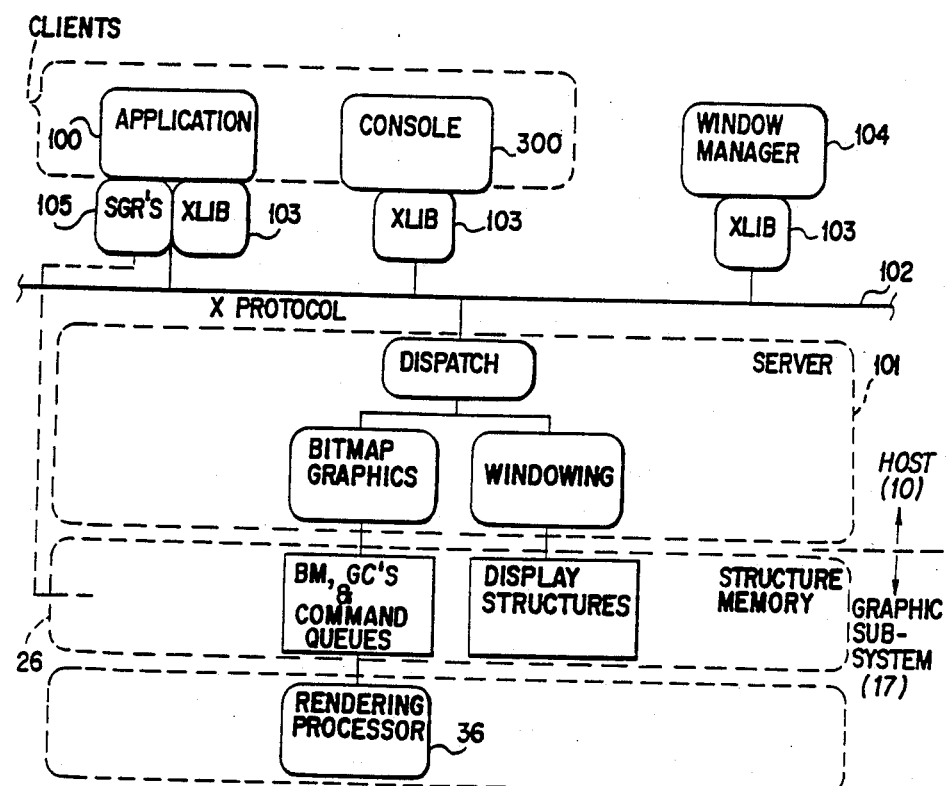
FIG. 2 is a block diagram of the X-software organization residing in the host for the X-window system.

Referring now to FIG. 2 there is illustrated a block diagram of the software organization in the host subsystem of the graphics system. An application 100 makes requests relating to the building of graphics data structures. Many applications 100 are present in the host subsystem, one of which is the console client 300, and are executed by the host processor The application programs 100 and console client 300 build multiple graphics data structures for manipulation and display by the graphic subsystem 17.

The X Window System is implemented to perform the windowing and bit map graphics requests contained in the applications program and console client 100. The X window system is fully described in publications published by the Massachusetts Institute of Technology such as *Xlib—C Language X Interface Protocol Version 11* by Jim Gettys, Ron Newman and Robert W. Scheifler and *X Window System Protocol, Version 11 Beta Test* by Robert W. Scheifler. These publications are available to use, copy, modify and distribute for any purpose without fee. Information on the X Window System may be obtained from the Massachusetts Institute of Technology Laboratory for Computer Science, 545 Technology Square, Cambridge, Mass. 02139.

The X Window System is based upon a client server model. The application 100 is the client which accomplishes its work by communicating its requests to a server process 101. The server 101 performs the requested function and returns a status to the client application 100. The major components of the X Window System are the X protocal 102, the server 101 and the XLib 103.

The X protocol 102 defines a model for communication between a server 101 and a client 100, and is used for the graphics subsystem 17. The model consists of several objects which interact in specified ways. The most fundamental object is the window, a rectangular array of pixels which may or may not be (partially) visible on the monitor 38 at a given time. Windows are in a hierarchy: in other words, windows may have sub-windows. When a sub-window is displayed, it will be clipped against its parent. The monitor is the root of the hierarchy. Each window has a unique ID, an optional property list, and may be manipulated by a process 100 other than the creating process 100. The X protocol 102 neither imposes nor encourages limits on the number of windows in existence (i.e. windows are "cheap").

Other objects defined by the X protocol 102 include
Color Maps: associations between pixel values and colors
pixmaps: a rectangular array of pixels
tiles: a special kind of pixmap used to fill regions and define cursors
polylines: a set of related points which are displayed in a window according to specified criteria
(glyph) fonts: a set of bitmaps which correspond to alphanumeric characters (includes proportional fonts)

The X protocol 102 also defines a number of events. These events are detected by the server 101 and are passed on to clients 100. Examples of events are
Exposure events: part of a displayed window which was previously occluded has now been uncovered
Keyboard events: a key on the keyboard has been pressed
Button Events: a button on a pointing device (e.g. mouse) has been depressed.

Clients 100 only receive notification of events in which they have explicitly expressed interest. Events are maintained in a time-ordered queue, and can be received by clients 100 either synchronously or asynchronously.

The X Server 101 mediates communication between client applications 100 and the graphic subsystem 17. Each client 100 establishes a connection to the server 101 via a communications protocol. A client 100 will send commands to a server 101 to perform functions such as drawing into a window, loading fonts, manipulating the color map, expressing interest in certain events, etc. The X Server 101 will then perform the requested functions, sending commands to the graphics subsystem 17 as a node in the structure memory 26.

A server 101 is always located on the same host processor as the monitor 38. It is possible for there to be more than one server per machine, and for a server to control more than one monitor 38. Each monitor, however, may be controlled by at most one server.

Xlib 103 is the Client's interface to an X Server. It is a procedural interface which corresponds to the functions provided by the underlying X protocol 102. Thus, there are calls to create windows, draw into them, etc. Since Xlib is a procedural interface, it is designed to be called from higher-level languages.

A window manager 104 is an application which implements a human-workstation interface. It typically provides a user with the ability to create, move, resize, iconify, and destroy windows. These actions are indicated by using the mouse as a pointing device, in conjunction with button clicks and keyboard hits. Although the X protocol 102 does not specify any one window manager, there are currently several from which to choose. X provides the necessary features for a customized window manager implementation. This means that (1) a window manager is not necessary for X applications to run; (2) it is possible to have multiple window managers (not at the same time on the same display, however).

A graphic package may be layered on top of the X Window System, as, for example, a GKS O/b package. The X Window System was developed for use in connection with bit map graphics systems. The bit map graphics contexts and command queues are processed by the rendering processor 36, as will appear.

Figure 3:
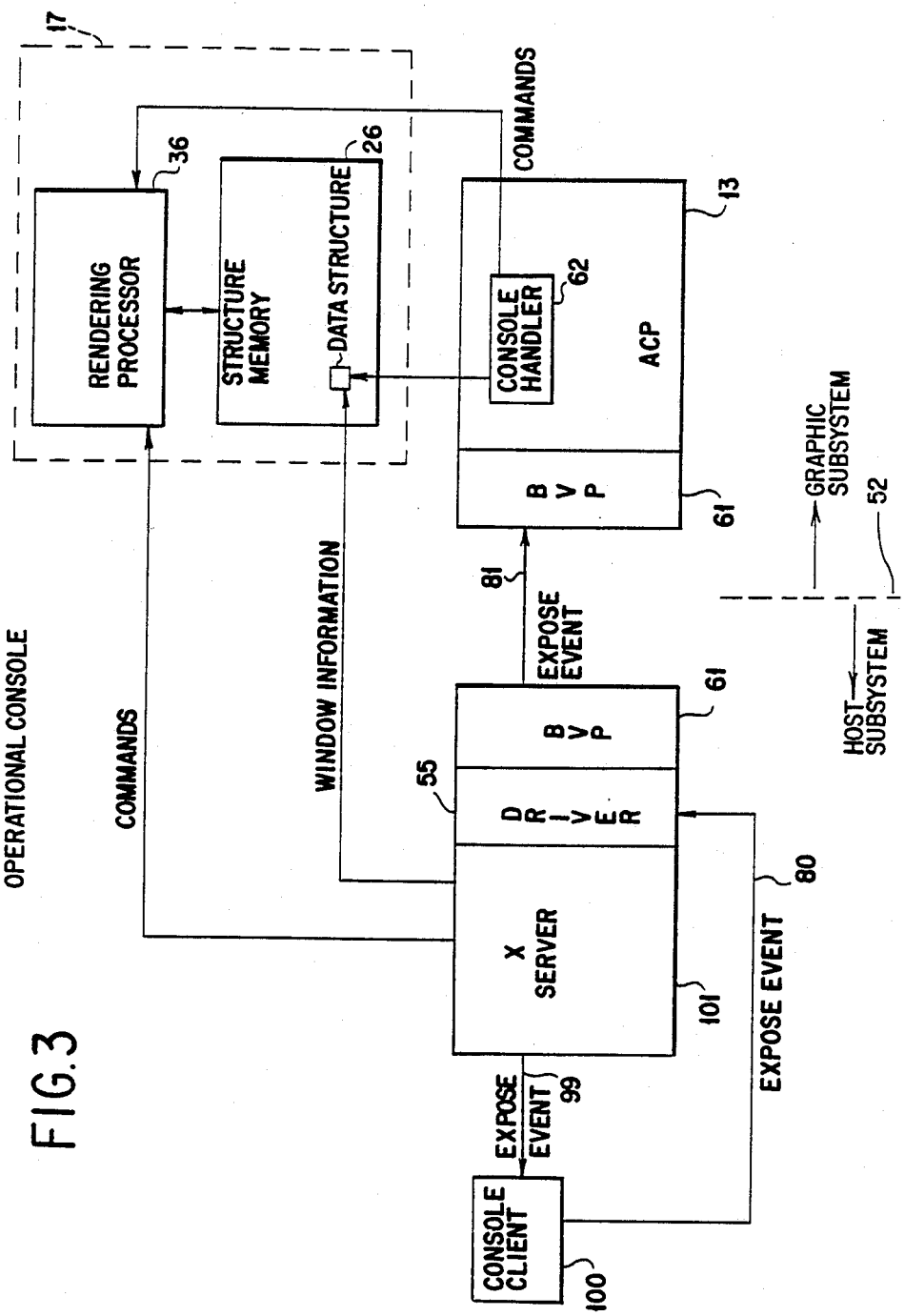
FIG. 3 is a block diagram of the console of the present invention.

Referring to FIG. 3, there is shown a console block diagram divided into a host subsystem and a graphics subsystem by dotted line 52. Included in the graphics subsystem is the control processor 13 and the graphics processor 17. The graphics processor 17 includes the structure memory 26 and rendering processor 36 as noted above. The console handler 62 in the control processor 13 can communicate with the structure memory 26 and send drawing commands to the rendering processor 36. The BVP interfaces 61 allow communication between the host subsystem and the graphics subsystem.

The host subsystem of the console includes the X-server 101 of the X-windowing system having a driver 55 and a console client 300. The console client 300 acts just as an applicant program having its own window, but yet displays console information in its window.

There is a significant amount of communication between the host and control processor. The host sends context manipulation commands as well as data to the control processor. The control processor sends input event and error information to the host.

Since the two processors are tightly coupled on the BI bus in the graphics workstation configuration, the choice for communication protocols is the BI VAX Port (BVP) 61. The driver 55 will have internal routines capable of communicating with the control processor using BVP. Similarly, the control processor operating system kernel will contain routines to communicate with the host.

Figure 4:
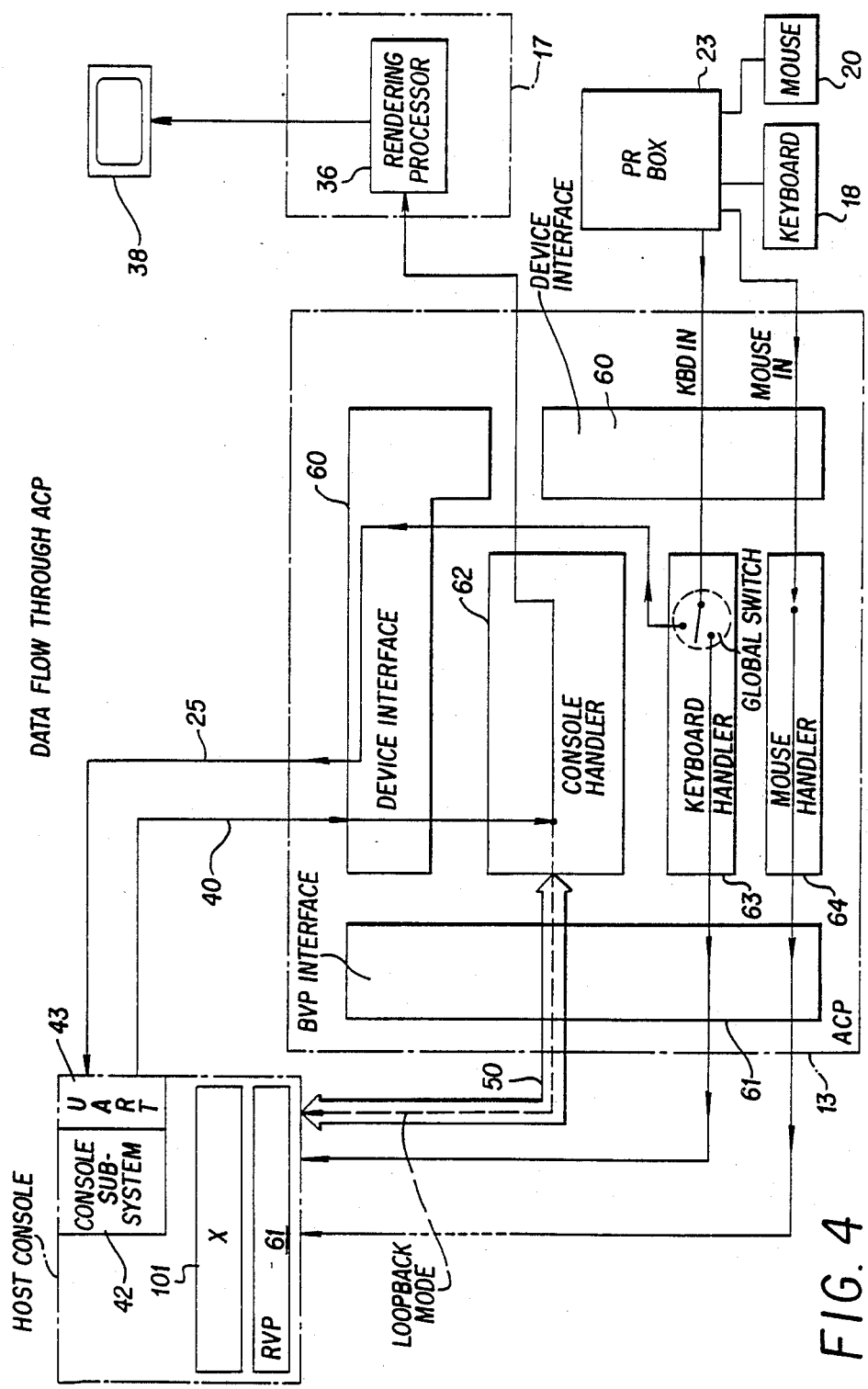
FIG. 4 is a software block diagram of the intermediate control processor shown in FIG. 1.

FIG. 4 is a software block diagram of the control processor 13 as well as showing data flow through the control processor. Software blocks operating inside the control processor are the device interface 60, BVP interface 61, console handler 62, keyboard handler 63 and mouse handler 64 all of which are fully described below. The X windowing system server 101 is shown communicating through the BVP in/out paths 50 with the BVP interface 61 in the control processor.

The peripheral repeater box (PR box) 23 having connected thereto a keyboard 18 and a mouse 20 communicates with the keyboard handler 63 and mouse handler 64, respectively, in the control processor through the device interface 60 as shown in FIG. 4. Also shown are the serial paths 25 and 40 from the device interface 60 of the control processor to the console serial port 43 of the host processor 10. The console handler 62 can direct console display input from the host console subsystem to the rendering processor 36 contained in the graphics processor 17 for display on monitor 38. It can also direct the console display input back to the host 10 through the BVP interface 61 for display by the X server 101. The mouse handler 64 and keyboard handler 63 in conjunction with the console handler 62 control the flow of data between the keyboard, mouse and console subsystems as will be fully described below.

The console software architecture is comprised of several components arranged in vertical layers. The components making up the console when in operational mode (X server initialized and running) are listed here along with a description of their function from the lowest layer upwards and are shown in FIGS. 3 and 4.

Device Interface

The device interface 60 does I/O with the console's serial lines 25 and 40. It fields input from the OCTART 43 connected to the host's console output line 40. The characters received from the host are for display and are passed to the console handler 62 through the device interface 60.

The device interface 60 also passes input from the keyboard 18 to the host through the OCTART serial interface. Keyboard characters to be passed to the host are received from the keyboard handler 63.

Console Handler

The console handler 62 orchestrates console display operations inside the control processor. It picks up characters for console display through its link with the device interface 60. What it does with those characters next depends on its current mode of operation. The control processor's console display modes are controlled by the host and implemented in the console handler 62. This is explained in greater detail below.

In the general case, the console display characters are not displayed locally by the console handler 62, but are passed to the control processor BVP Interface 61 to be routed to the host's X server 101. In other modes, the console characters are displayed by the console handler 62 without host assistance.

The console handler 62 receives commands from the host system instructing it to change console display modes. These mode change commands from the host are received through the control processor BVP Interface 61.

BVP Interface

The control processor BVP Interface 61 passes and receives data from the host system's driver 55. The console display characters are received from the console handler 62 and passed along to the host system's driver 55. Mode change commands received from the host system's drives 55 are passed to the console handler 62.

Host Driver and X Server

The host driver 55 including its BVP Interface 61 obtains the console characters from the console handler 62. These are formatted as input events and passed up to the X server's input handler.

The input handler of the X server 101 dequeues console character events, recognizes them as belonging to the server's input extension, and passes them there. The input extension code delivers the console display character to whichever X client has grabbed that event type. In this case, the grabber is the console client 300.

Console Client

The console client 300 echoes characters in its window via the standard terminal emulation path through the X server in loopback mode or notifies the console handler 62 to do the emulation in control processor console emulation mode. The Console Client 300 process grabbed ownership of the console display character input event type as part of its initialization sequence. This is done using the standard input control procedures provided by input extensions to the X Server. Also at initialization time, the console client 300 opens a 2D X Window in which the console characters it receives will be displayed.

Upon receipt of the console display character, the Console Client 300 uses the standard X terminal emulation paths to display the character on the console when in the loopback mode. As a standard X client, the Console Client's window may be stacked, iconified, etc., by the human interface.

Figure 5:
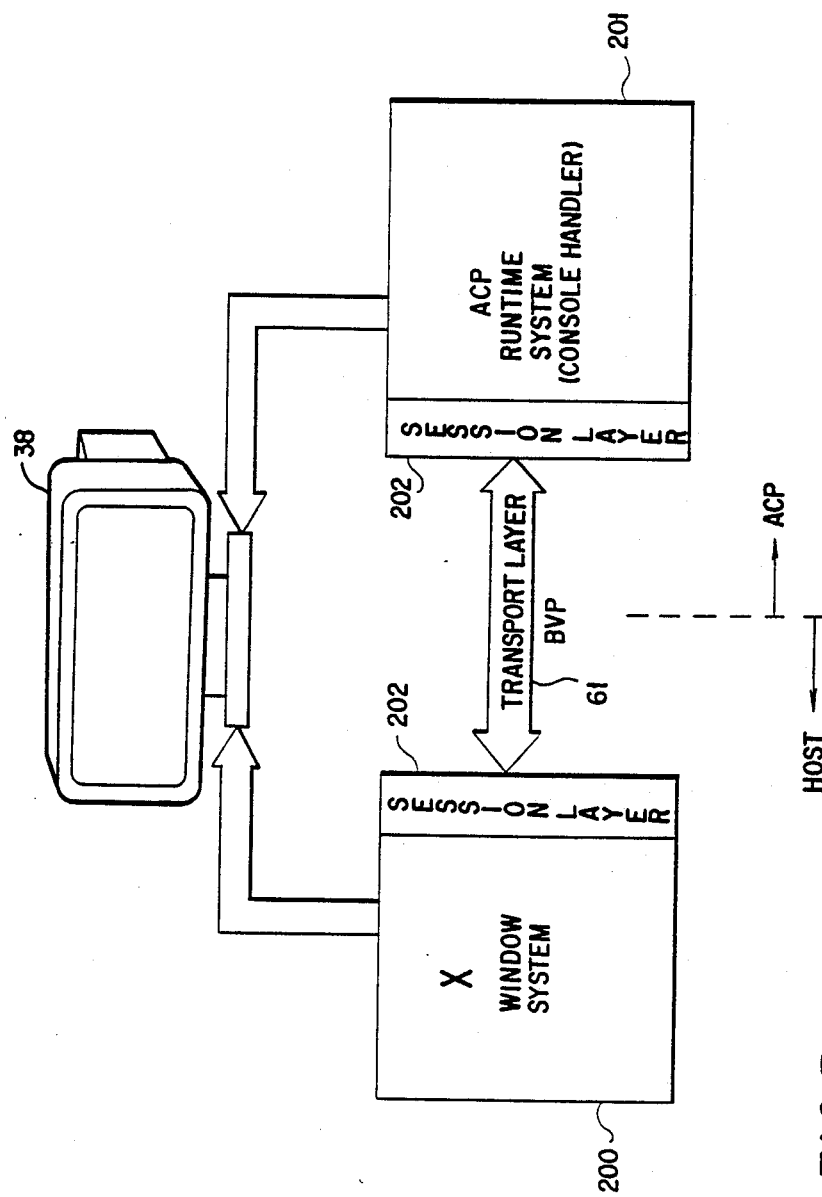
FIG. 5 is a general block diagram of the software embodied in the graphics workstation.

FIG. 5 is a general bloc diagram of the software bodies running in the graphics system. There are two major bodies of software: X-window system software 200 and control processor runtime system (VAXELN) software 201. Both bodies want access to the monitor 38. The software bodies are coupled by means of a BI VAX PORT (BVP) or transport layer 61 as well as session layers 202. Arbitration of the access to the monitor is the subject of this invention.

Figure 6:
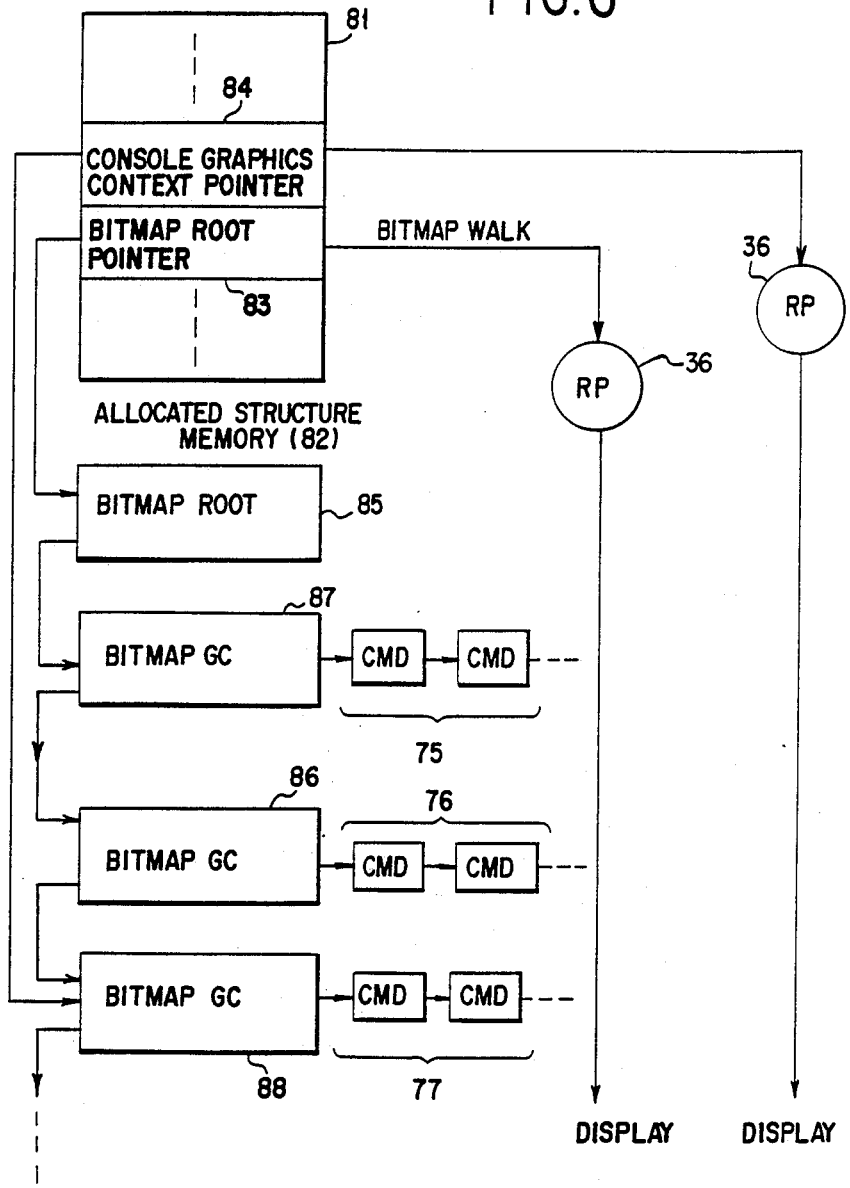
FIGS. 6 and 7 detail aspects of the rendering processor and structure memory interface shown in FIG. 3.

FIG. 6 shows the rendering processor and structure memory interface. The interface contains a bit map root pointer 83 which is located in a reserved area of structure memory 81. The bit map root pointer points to the graphics contexts that are dynamically located in the allocated portion 82 of structure memory. Also located in the reserved area of structure memory is a console graphics context pointer 84 which points to a console graphics context 88. The x-server commands the bit map root pointer and the console handler commands the console graphics context pointer 84.

Figure 7:
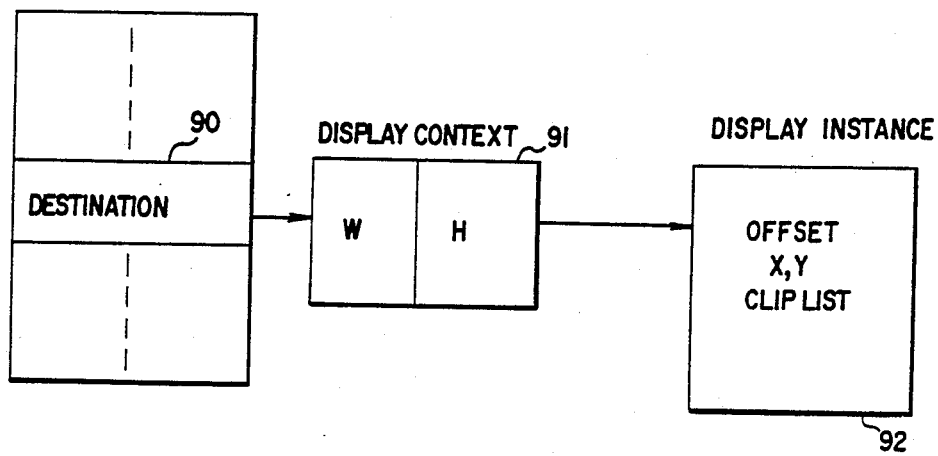

The graphics contexts 86–88 act as pointers to data structure 75–77. Data structures consist of user generated commands. FIG. 7 illustrates the state block of the graphics contexts (86–88). One piece of the state block is the destination 90. The destination tells where to put the graphics on the screen. This is done by the display context 91 which contains height and width data and the display instance 92 which contains x-y coordinate, and offset data etc.

Operation of the Console Interface

Console mode is defined as the CPU mode where the operating system software is not in control of the host system. Instead, control belongs to the console subsystem.

The console terminal is special in that it is connected to the console subsystem. During normal operation, data from the console terminal is passed through to the operating system for interpretation. In console mode, data is interpreted by the console subsystem. This implies the existence of some special hardware and software which resides between the console terminal and either the operating system or the console subsystem. Given the existence of this interface, it is possible to emulate the console terminal device without affecting the integrity of the console subsystem. This is accomplished by having the workstation emulate the console terminal.

A single-user workstation, with its keyboard, monitor, and computational power can perform any required console terminal functions. In fact, it is redundant to require a separate terminal to enter and use console mode. However, in some cases, it is desirable to have both capabilities: use the workstation or a separate terminal as the system console (perhaps to diagnose a problem with the workstation itself in the latter case).

Since the host provides a special interface for the console terminal, it should be possible for the workstation to emulate the other side of that interface. The workstation can send and receive data from the console subsystem according to a predefined protocol. It can also provide the user with a console terminal emulator to allow interaction with the console program.

The graphics workstation block diagram of FIG. 1 indicates the serial interfaces for both the host cpu 10 and the control processor 13. Connector zero for both the host and control processor is reserved for the console terminal device. A terminal 41 can be physically connected to this host port with a standard RS232 connector and become the console terminal. However, by default, a jumper cable will connect port zero of the host with port zero of the control processor 13. This will permit the control processor to transfer data to the host through its serial console port. The control processor now has the means to emulate the host console terminal and the host console front-end will not be able to distinguish between these two paths. The control processor will also be able to detect its disconnection from the console port which indicates that a real terminal can only be used for console interaction.

Console Display Modes

There are three basic types of console display modes: ROM-based console, RAM-based console, and Operational console. The various modes are defined in terms of the behavior of console display code residing in the control processor 13.

A. ROM-based console

This mode is entered when the system is powered on or when the control processor 13 receives a BI Node Reset command. Upon entering the ROM-based console, the control processor 13 begins running the ROM code 48 which initiates a series of self tests on both the control processor 13 and graphics processors 17. The control processor self test includes checks to insure that certain parts of the graphics subsystem are working well enough to provide system console functions.

Further, in ROM-based console there must be an ability to do simple graphics. A small set of display microcode in the ROM 48 is loaded into the graphics data manager 33 of the graphics processor 17 to perform the operations of creating a window, loading color and video lookup tables and graphics bit-blit operations.

ROM-based console thus permits looking and interacting with the host console program 42 and the display of operating system boot information. The display of the console information is done in a window which the console puts up on the monitor screen 38.

The control processor OCTART 44 provides send and receive channels to the host processor 10 and the PR box 23. The ROM-based console code listens to these connections. When a keystroke from the keyboard is received, it is converted to ASCII and sent to the host console subsystem 42 via the octart 44. Keyboard keycodes are converted into ASCII characters using the translation table that conforms to the international variation of the keyboard. The translation tables are stored in the ROM 48 of the control processor 13. When the ROM code in the control processor 13 receives a console character from the host, it displays it in the console window on the monitor screen 38.

After the host system loads the control processor runtime code (VAXELN) it interrupts the ROM code which then transfers to the RAM code 47.

B. RAM-based console

The ROM-based console transitions into the RAM-based console upon booting the operating system. Either VMS or Ultrix is booted which as part of the startup will load the control processor runtime code. The body of executable code is loaded into the control processor RAM 47 while the ROM-based console is running. Once the code is loaded into the RAM 47, an interrupt is generated which interrupts the processor running the ROM-based console and instruct the processor to jump to the RAM code. The processor goes to the RAM code and does further initialization that is used when the windowing system comes up. Meanwhile, the RAM console uses the small set of display microcode which was loaded from the ROM 47 into the graphics data manager 33. Thus, the RAM console just emulates the ROM-console and the viewer cannot tell the difference. This RAM-based console Standalone feature is implemented in the console handler 62.

When stand-Alone RAM-based console is entered at boot time, a global switch in the keyboard handler 63 is thrown to tell the keyboard handler 63 to deliver keyboard input to the host console subsystem via the device interface 60.

When console display characters come in to the console handler 62 from the host console subsystem via the device interface 60, they are displayed in a console window on the graphics subsystem monitor screen 38. When keyboard input comes in from the PR box 23, the keyboard handler converts it to ASCII (as detailed above) and sends it to the host console subsystem 10.

Prior to loading the operational microcode, the RAM-based console communicates with the screen using the ROM-based microcode graphics. Before the windowing system is brought up and the operational microcode is loaded, the host processor contacts the RAM console and informs it not to write any console data to the screen because the RAM-based console cannot communicate with the operational microcode. Therefore, during loading of the operational microcode, the RAM console saves any console characters received in a buffer. Once the operational microcode is loaded the operational console is set up and will display the characters that were stored in the buffer by the RAM-based console.

In both the ROM and RAM-based console modes, there must be an ability to perform primitive graphics. However, the disadvantages of these modes are that the display is blasted onto the screen from the ROM microcode thus destroying the previous screen contents. This occurs because the ROM-code (which is the start-up microcode) is reloaded in place of the operational microcode which performs a different set of graphics functions. The operational-based console overcomes this problem by having the control processor cooperate with the host processor X-system software.

C. Operational-based console

The operational mode which performs full emulation of the console uses the rendering processor interface to do bit-map graphics commands e.g. drawing windows, printing text, etc. for the console handler. Operation of the rendering processor is explained in detail in co-pending application Ser. No. 085,081 referenced above. The console handler builds queue entries to the rendering processor which then executes the drawing commands in the structure memory. Therefore, because the host processor has set up the windows, communication is necessary between the host and control processor to insure that the window is redrawn appropriately, the control processor maintains enough data to redraw window contents at any time, and the control processor knows how to issue rendering processor commands in the context of the windowing system set up by the host processor.

The operational console is designed to work in harmony with the X-windowing system running on the host processor even though the RAM-code is not executing on the same processor as the windowing system.

Referring to FIG. 5, in general there are two bodies of software running in the operational graphics system i.e. the X-window system 200 and the control processor runtime system 201. Both software bodies want to display on the monitor screen 38 for different purposes but at the same time. The X-window system wants to perform window manipulations on the screen. The control processor runtime system wants to display console data on the same screen. The X-window software is running on the host processor while the control processor runtime system is executed by the control processor.

A communication channel between the host processor and control processor is known as the BI Vax Port protocol (BVP) or transport layer 61. The X-window system and the control processor have session level protocol layers 202 that receive the communications from the BVP or transport layer. This allows the two high level bodies of software i.e. X-window and console handler, to communicate with each other while still being insulated from the specifics of the BVP which is a complex transport protocol.

There are two embodiments that allow both systems to access the screen 38 without destroying the previous screen contents once in operational mode i.e., loopback and control processor console emulation.

(a) Loopback

Loopback mode is entered from the RAM-based stand-alone mode. In loopback mode, no display of console characters is done by the console handler 62. Instead, the console handler 62 passes the display characters through the BVP interface 61 to the X server 101 which then displays them via standard X window display methods. There is no need to arbitrate between the two bodies of software having access to the single piece of hardware.

Each time a console character is passed to the host in the loopback mode i.e. host receives a packet from the BVP protocol, the console handler 62 checks a flag in the host processor which is incremented by the host system driver 55 on each BVP queue access of a packet. A timeout is started while waiting for this to happen. If the timeout expires before the console handler verifies the flag, the host is presumed dead and stand-alone display mode is re-entered. However, reentering the standalone mode destroys the subsystem state and microcode.

A problem arises in the loopback mode which the preferred embodiment, that of control processor console emulation, of the operational-based console mode overcomes. Because the loopback mode relies on the whole graphics system to display the characters received initially by the control processor software, when the host processor halts or crashes the characters are lost because they have been put into the front end of the BVP interface but yet the host transport layer cannot pick them up as the host is dead.

In a graphics system of this type, when the host processor halts the entire system does not actually quit executing instructions. Rather, upon halting, the host jumps from where it was at in system memory, i.e. executing operating system code or window system code, etc. to an internal console subsystem ROM 42. The host processor keeps on running and the ROM code can be used to investigate or interact with the larger system to find out why the system halted.

In light of this, when the host system halts it is very crucial to have the console available on the screen in its own console window and to be able to interact with the console through the system keyboard.

(b) Control Processor Console Emulation

The control processor console emulation mode allows the control processor runtime system 201 to directly put the console data into the console window on the screen. Additionally, it provides for continued execution out of the system RAM where it left off when the halt occurred. This enables the windowing system to remain undisturbed.

An example of the control processor console emulation occurs if the windowing system is running and then the system is halted, i.e., CNTRL P is entered. In that condition when the system is halted, it is crucial to be able to examine memory. Therefore, when the system halts while executing the operational code in the system RAM, it jumps back into the console ROM as detailed above and the console can inspect the system memory. The console data is displayed in the console window independent of the other windows on the screen. Next, continuing after the halt causes the main execution of the host processor to return to the instruction following the instruction it was executing at the time of the halt. Therefore, it allows the console to stop the processor and interact with the system using the keyboard to inspect the memory etc. and then be able to resume where it left off. This is especially advantageous where the windowing system is malfunctioning on the screen. Control processor console emulation allows the user to inspect and debug the system and then continue with the screen undisturbed.

Referring to FIG. 1, in order for the windowing system to resume with the display hardware in the same state, there must be cooperation between the control processor and the host. When the host processor is halted the control processor continues running and the console handler directs console display data to the screen. The console subsystem ROM 42 in the host fields keystrokes from the control processor and echoes them out to the screen through the control processor on serial paths 25 and 40, respectively. The host will recognize a halt received from the control processor and stop executing from the system RAM and begins executing from the console subsystem ROM. A signal is sent through the BVP interface to the console handler informing the console handler to direct console display data to the screen. Therefore, when the host is put into the halt mode all display operations and keyboard inputs use paths 25 and 40 and the control processor does not deliver keyboard characters to the host anymore through the BVP interface. So as long as the console window has been established the control processor can write into the console window even though the host is dead. Therefore because of paths 25 and 40 the console is still alive.

The data flow through the control processor in the operational-based console emulation mode is illustrated in the software block diagram of FIG. 4. The BVP interface 61 is the data connection between the host processor 10 and the control processor 13. The BVP interface 61 passes console enabling signals from the host to the console handler 62 and receives console display data from the console handler when in loopback mode. The BVP interface also receives data from the keyboard and mouse handlers 63 and 64 inside the control processor when undergoing normal processing. A device interface 60 directs console keyboard information out to the host console. Also, the device interface 60 receives console display in from the host console and directs it to the console handler 62 to send to the screen 38 through the rendering processor 36 when in control processor console emulation mode.

Further, the device interface 60 handles keyboard and mouse input via the peripheral repeater box 23. A keyboard handler 63 in the control processor 13 receives the keyboard in data from the device interface 60. The keyboard handler 63 then either directs the data to the host processor through the BVP interface 61 (normal processing) or to the host console subsystem 42 via the device interface 60 (console mode).

The decision on where the keyboard input is routed is made by the mouse handler 64 in the control processor. A mouse pointer 20 is connected to the peripheral repeater box 23. The mouse handler 64 inside the control processor looks at the mouse position (i.e., system pointer—the position of the cursor on the screen). When the screen cursor is moved into the console window (i.e., mouse points to the console window) then the mouse handler 64 throws a global switch in the keyboard handler 63 to direct keyboard input to the console subsystem 42 via the device interface 60, thus enabling user interaction with the console. When the system pointer leaves the console window the switch in the keyboard handler 63 is set to route data through the BVP interface 61 for normal processing.

Console display data 25 always goes to the console handler 62 inside the control processor through the device interface 60. When in console emulation operational mode, the console handler 62 then loads the console display data into the rendering processor and structure memory interface as shown in FIG. 6 for display on the screen. If using loopback mode, the console handler routes the console display data to the host via the BVP interface for display by the standard X-system.

When the system pointer is not in the console window then the input keystrokes go to the X-windowing system via the BVP interface 61. If the console emulation mode is operational, then as described above the input keystrokes go to the console subsystem ROM in the host which echoes it back to the console handler. The console handler 62 then displays the keystroke character via the rendering processor 36.

A console block diagram of the control processor operational console made is shown in FIG. 5. The block diagram is divided into a host subsystem and a graphics subsystem including the control processor 13 and graphics processor 17. Located in the host subsystem is the X-server 101 including its driver 55 and BVP interface 61.

In operation of the control processor console emulator, the console client 300 has the X-server 101 set up a console window in the structure memory 26 upon initialization of the system. The X-server 101 creates windows for all the applications including the console client, therefore it does not realize that the console client window is for a special purpose. To establish the console window and maintain it thereafter requires the console client's informing the control processor, specifically the console handler 62, of any window changes.

In the X-windowing system, whenever a window becomes visible, i.e., is deiconified, brought to the top of stack etc., the X-server realizes the occurrence. The X-server knows which one of its clients owns the window although it does not realize the windows purpose. Therefore, an exposure event is generated by the X-server to the client when the window becomes exposed.

When the console client 300 receives an exposure event from the X-server, it must notify the console handler 62 in the control processor 13 that an exposure event was generated and therefore the console handler 62 should repaint the screen. The console client 300 bypasses X-server 101 when informing the console handler 62 of an exposure event. Rather, it takes path 80 through the driver 55 and BVP interface 61 to send the message to repaint the window to the console handler 62.

The interface to the rendering processor 36 and structure memory for the X-server 101 and console handler 62 is illustrated in FIG. 6. The structure memory 26 has both a reserved 81 and an allocated 82 section.

The reserved section of structure memory 81 contains a bit map root pointer 83 and a console graphics context pointer 84. The bitmap root pointer 83 points to a bit map root 85 which is allocated for in structure memory. The bit map root 85 links a string of graphics contexts one of which is the console graphics context which was set up by the X-server upon initialization of the system. When the console handler needs to display console data it will access the console graphics pointer 84 to find the console graphics context. Then it loads the console display data in structure memory and queues the address of the new data structure in the rendering processor. The console handler commands the rendering processor 36 to walk through the graphics context to display the contents of the data structure in the console window. Thus the control processor console emulation works in harmony with the other windows by having a separate console graphics context set up by the X-server. The X-server does not realize that there is a separate path for the console client and therefore the X-server can still access the other graphics contexts while the console is being displayed. This separates the internal management of the console display window from the other windows thereby allowing the console emulator to function without destroying the window graphics of the other clients.

What is claimed is:

1. A method for performing console emulation at a workstation terminal having a display device, the method comprising the steps of:
    (a) operating a console subsystem in a first central processing unit (cpu);
    (b) coupling a second cpu located at the workstation terminal, to said first cpu, for controlling a graphics processor;
    (c) operating a windowing system on said first cpu and creating with said windowing system a plurality of windows in the graphics processor for display on the display device, one of said windows being a console window;
    (d) said windowing system notifying a console client application when an exposure event of said console window occurs;
    (e) emulating said console subsystem in the console window with said second cpu to provide a workstation console;
    (f) operating said workstation console simultaneously with said plurality of windows;
    (g) providing input data to said second cpu from a plurality of input devices coupled to said second cpu;
    (h) operating a keyboard handler and a mouse handler by the second cpu to route the input data through said second cpu to said console subsystem when said exposure event occurs;
    (i) receiving console input data into said console subsystem in the first cpu from the second cpu and generating console display data from said console subsystem, said console display data being received by the second cpu;
    (j) directing, with a console handler in said second cpu the console display data received by the second cpu to the graphics processor;
    (k) said step of directing the console display data by said second cpu further includes the step of operating a driver by the first cpu to inform the console handler of said exposure event; and
    (l) directing the console display data with the console handler directly to said graphics processor for display in said console window.

2. A method according to claim 1 wherein said step of operating a driver to inform the console handler is carried out by sending a signal from the console client application in said first cpu to the console handler through an interface.

3. A method according to claim 1 further comprising the steps of:
    (a) creating a plurality of graphics contexts with said windowing system, one of which is a console graphics context;
    (b) operating said console client to build a data structure in said console graphics contexts with said console display data from said console handler; said console graphics context being separately accessible by said console handler.

4. A method for performing console emulation at a workstation terminal having a display device, the method comprising the steps of:
    (a) operating a console subsystem in a first central processing unit (cpu);

(b) coupling a second cpu located at the workstation terminal, to said first cpu, for controlling a graphics processor;

(c) operating a windowing system on said first cpu and creating with said windowing system a plurality of windows in the graphics processor for display on the display device, one of said windows being a console window;

(d) said windowing system notifying a console client application when an exposure event of said console window occurs;

(e) emulating said console subsystem in the console window with said second cpu to provide a workstation console;

(f) operating said workstation console simultaneously with said plurality of windows;

(g) providing input data to said second cpu from a plurality of input devices coupled to said second cpu;

(h) operating a keyboard handler and a mouse handler by the second cpu to route the input data through said second cpu to said console subsystem when said exposure event occurs;

(i) receiving console input data into said console subsystem in the first cpu from the second cpu and generating console display data from said console subsystem, said console display data being received by the second cpu;

(j) directing by the said second cpu the console display data received by the second cpu to the graphic processor;

said step of directing the console display data by said second cpu is carried out by a console handler directing the console display data to the windowing system in said first cpu for subsequent updating of the display in said console window and further comprising the steps of:

(k) operating said windowing system by the first cpu to create a plurality of graphic contexts, one of which is a console graphics context; and (l) operating said console client to build a data structure in said console graphics contexts with said console display data from said first cpu.

5. A method according to claim 4 or 3 wherein said graphics processor further includes a rendering processor, the method comprising the step of:

(m) commanding the rendering processor by the second cpu to traverse a graphics context for display of said data structures, said commands being sent by either the windowing system or the console handler allowing the console window to be displayed on the display device without destroying the plurality of graphics contexts.

* * * * *